(12) United States Patent
Liu et al.

(10) Patent No.: US 10,358,561 B2
(45) Date of Patent: Jul. 23, 2019

(54) HYDROPHOBIC ARTICLE

(71) Applicant: Dow Corning Corporation, Midland, MI (US)

(72) Inventors: Junying Liu, Midland, MI (US); William J. Schulz, Jr., Peoria, AZ (US)

(73) Assignee: Dow Silicones Corporation, Midland, MI (US)

(*) Notice: Subject to any disclaimer, the term of this patent is extended or adjusted under 35 U.S.C. 154(b) by 40 days.

(21) Appl. No.: 15/121,130

(22) PCT Filed: Apr. 7, 2015

(86) PCT No.: PCT/US2015/024627
§ 371 (c)(1),
(2) Date: Aug. 24, 2016

(87) PCT Pub. No.: WO2015/157219
PCT Pub. Date: Oct. 15, 2015

(65) Prior Publication Data
US 2017/0015843 A1 Jan. 19, 2017

Related U.S. Application Data

(60) Provisional application No. 61/977,352, filed on Apr. 9, 2014.

(51) Int. Cl.
*C09D 5/16* (2006.01)
*C09D 7/62* (2018.01)
(Continued)

(52) U.S. Cl.
CPC .............. *C09D 5/1681* (2013.01); *B32B 7/12* (2013.01); *B32B 27/08* (2013.01); *B32B 27/20* (2013.01);
(Continued)

(58) Field of Classification Search
CPC ...... C09D 5/1681; C09D 7/62; C09D 183/04; B32B 27/20; B32B 27/08; B32B 27/283;
(Continued)

(56) References Cited

U.S. PATENT DOCUMENTS 3,615,272 A 10/1971 Collins et al.
4,808,653 A 2/1989 Haluska et al.
(Continued)

FOREIGN PATENT DOCUMENTS

CN 102102168 6/2011
CN 102234183 A 11/2011
(Continued)

OTHER PUBLICATIONS

CN102102168, abstract.
(Continued)

*Primary Examiner* — Nathan L Van Sell

(57) ABSTRACT

A hydrophobic article includes a substrate and a nanoparticle layer disposed on the substrate and including nanoparticle agglomerates wherein the nanoparticle agglomerates have an average volume based size of at least 100 nanometers as determined using light scattering via ISO 13320. The hydrophobic article also includes a binder layer disposed on and in direct contact with the nanoparticle layer and including an oxidatively cured product of a silicon-based resin and an outermost layer that is disposed opposite the substrate and on and in direct contact with the binder layer. The hydrophobic article has a water contact angle of greater than or equal to 90 degrees as measured on the outermost layer of the hydrophobic article and determined using modified ASTM D5946-04.

11 Claims, 4 Drawing Sheets

(51) Int. Cl.
*C09D 183/04* (2006.01)
*B32B 27/28* (2006.01)
*B32B 27/20* (2006.01)
*B32B 27/08* (2006.01)
*B32B 7/12* (2006.01)

(52) U.S. Cl.
CPC .............. *B32B 27/283* (2013.01); *C09D 7/62* (2018.01); *C09D 183/04* (2013.01); *B32B 2264/102* (2013.01); *B32B 2307/554* (2013.01); *B32B 2307/584* (2013.01); *B32B 2307/73* (2013.01); *B32B 2457/12* (2013.01); *B32B 2457/208* (2013.01)

(58) Field of Classification Search
CPC . B32B 7/12; B32B 2457/12; B32B 2264/102; B32B 2307/584; B32B 2307/554; B32B 2307/73; B32B 2457/208
See application file for complete search history.

(56) References Cited

U.S. PATENT DOCUMENTS

| | | | |
|---|---|---|---|
| 4,999,397 A | 3/1991 | Weiss et al. | |
| 5,008,320 A | 4/1991 | Haluska et al. | |
| 5,010,159 A | 4/1991 | Bank et al. | |
| 5,063,267 A | 11/1991 | Hanneman et al. | |
| 5,210,160 A | 5/1993 | Saive et al. | |
| 5,290,394 A | 3/1994 | Sasaki | |
| 5,416,190 A | 5/1995 | Mine et al. | |
| 7,425,351 B2* | 9/2008 | Chevalier ............... | C08L 83/04 427/379 |
| 9,896,557 B2 | 2/2018 | Pett et al. | |
| 2007/0141114 A1* | 6/2007 | Muisener ............. | C09D 5/1693 424/427 |
| 2007/0298216 A1* | 12/2007 | Jing ......................... | B05D 5/08 428/141 |
| 2008/0093350 A1 | 4/2008 | Ma et al. | |
| 2012/0107558 A1 | 5/2012 | Koval et al. | |
| 2013/0040073 A1* | 2/2013 | Pett ......................... | C08J 7/123 427/596 |
| 2013/0115381 A1 | 5/2013 | Schwartz et al. | |
| 2014/0017457 A1* | 1/2014 | Megaridis ................ | C09D 1/00 428/195.1 |
| 2014/0242343 A1* | 8/2014 | Free ......................... | B44C 1/17 428/164 |

FOREIGN PATENT DOCUMENTS

| | | |
|---|---|---|
| CN | 102815052 A | 12/2012 |
| CN | 103201331 A | 7/2013 |
| CN | 103524053 A | 1/2014 |
| JP | 59-178749 | 10/1984 |
| JP | 60-086017 | 5/1985 |
| JP | 63-107122 | 5/1988 |
| WO | 2004104116 | 12/2004 |
| WO | 2012138992 | 10/2012 |
| WO | 2014038727 | 3/2014 |

OTHER PUBLICATIONS

JP59-178749, machine translation.
JP60-086017, machine translation.
JP63-107122, machine translation.
CN102234183A Abstract from Derwent Innovation.
CN103201331A Abstract from Derwent Innovation.
CN102815052A Abstract from Derwent Innovation.
CN103524053A Abstract from Derwent Innovation.
Search report from corresponding Chinese 201580009952.2 application, dated Oct. 30, 2018.
Search report from corresponding Japanese application 2016-558036, dated Mar. 4, 2019.

* cited by examiner

HYDROPHOBIC ARTICLE

CROSS REFERENCE TO RELATED APPLICATIONS

This application is a U.S. national stage filing under 35 U.S.C. § 371 of PCT Application No. PCT/US2015/024627 filed on Apr. 7, 2015, currently pending, which claims the benefit of U.S. Provisional Patent Application No. 61/977,352 filed Apr. 9, 2014, under 35 U.S.C. § 119 (e). PCT Application No. PCT/US2015/024627 and U.S. Provisional Patent Application No. 61/977,352 are hereby incorporated by reference.

The present disclosure generally relates to a hydrophobic article. More specifically, the article includes nanoparticle agglomerates.

Superhydrophobic coatings are well known in the art and provide water repellency. Superhydrophobic coatings may have self-cleaning, anti-icing, and anti-dust properties. Some of these coatings are used in maritime applications, vehicle applications, medical applications, and electronic applications. However, these coatings are known to be susceptible to wear, abrasion, and degradation over time.

Processes are known in the art to form hydrophobic coatings using nanoparticles and fluorosilanes. However, these processes utilize systems that stack nanoparticles on substrates using only gravity. For that reason, these processes form layers of nanoparticles on substrates that provide very little surface topography, resulting in low hydrophobicity and significantly reduced resistance to abrasion over time. Accordingly, there remains an opportunity for improvement.

BRIEF DESCRIPTION OF THE DRAWINGS

Other advantages of the present disclosure will be readily appreciated, as the same becomes better understood by reference to the following detailed description when considered in connection with the accompanying drawings wherein.

SUMMARY OF THE DISCLOSURE

Figure 1:
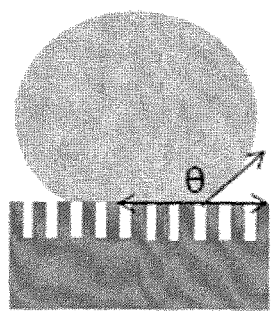
FIG. 1 is a general schematic showing water contact angle (θ) of a drop of liquid disposed on a surface.

The present disclosure provides a hydrophobic article including a substrate and a nanoparticle layer disposed on the substrate and including nanoparticle agglomerates wherein the nanoparticle agglomerates have an average volume based size of at least 100 nanometers as determined using light scattering via ISO 13320. The hydrophobic article also includes a binder layer disposed on and in direct contact with the nanoparticle layer and including an oxidatively cured product of a silicon-based resin and an outermost layer that is disposed opposite the substrate and on and in direct contact with the binder layer. The hydrophobic article has a water contact angle of greater than or equal to 90 degrees as measured on the outermost layer of the hydrophobic article and determined using modified ASTM D5946-04.

DETAILED DESCRIPTION OF THE DISCLOSURE

The present disclosure provides a hydrophobic article 10 (hereinafter described as the "article"). The terminology "hydrophobic" describes that the article 10 has a water contact angle of greater than or equal to 90 degrees as determined using modified ASTM D5946-04. In various embodiments, the article 10 has a water contact angle of greater than or equal to 90, 95, 100, 105, 110, 115, 120, 125, 130, 135, 140, 145, 150, 155, 160, 165, 170, 175, or (up to or about) 180, degrees as determined using modified ASTM D5946-04. In still other embodiments, the article 10 has a water contact angle of from 150 to 175, from 155 to 170, from 160 to 165, from 150 to 165, from 150 to 160, or from 150 to 155, degrees as determined using modified ASTM D5946-04. In additional embodiments, any value, or range of values, both whole and fractional, within or between any one or more values described above are contemplated. The article 10 may be described as "super" hydrophobic and have a water contact angle greater than 120, 125, 130, 135, 140, 145, 150 degrees, etc. e.g. those values as described above, up to about 180 degrees. Modified ASTM D5946-04, as used herein, is described in detail in the Examples set forth below. To be clear, water contact angle is a characteristic and not an action. For example, water contact angle does not require that water be beaded on the article 10 but is a measurable property.

Although the article 10 exhibits the aforementioned water contact angle upon formation, the article 10 may also be resistant to wear, abrasion, and degradation over time. For example, the article 10 may exhibit a water contact angle of greater than or equal to 80, 85, 90, 95, 100, 105, 110, 115, 120, 125, 130, 135, 140, 145, 150, 155, 160, 165, 170, or 175, from 140 to 175, from 145 to 170, from 150 to 165, from 155 to 160, from 140 to 155, from 140 to 150, or from 140 to 145, degrees as determined using modified ASTM D5946-04, after 10,000, 9500, 9000, 8500, 8000, 7500, 7000, 6500, 6000, 5500, 5000, 4500, 4000, 3500, 3000, 2500, 2000, 1500, or 1000, 900, 800, 700, 600, 500, 400, 300, 200, 100, or after from 100 to 5000, abrasion cycles performed using a microfiber cloth under 5N loading over a 20 mm×20 mm surface area, e.g. when the article 10 includes an adhesive layer (described in greater detail below). In one embodiment, the article 10 exhibits a water contact angle of greater than or equal to 80 degrees as determined using modified ASTM D5946-04 after 100 abrasion cycles. Just as above, in additional embodiments, any value, or range of values, both whole and fractional, within or between any one or more values described above are contemplated. The test method using the microfiber cloth is further described in the Examples below.

Typically, applications that require high water contact angles after about 100 abrasion cycles include, but are not limited to, surfaces that either do not come into contact with humans or that have little contact with humans, e.g. internal surfaces of electronic devices. Applications that require high water contact angles after about 1,000 abrasion cycles typically include, but are not limited to, windows. Applications that require high water contact angles after about 5,000 or even 10,000 abrasion cycles typically include, but are not limited to, touch screens. In this paragraph, the terminology "high" may describe any water contact angle or range thereof, as set forth above.

The article 10 may be alternatively described as a multi-layer article 10, a (multi-layer) film, a composite article 10, or a composite film. The article 10 is not limited to any particular dimensions or application. In other embodiments, the article 10 is utilized in self-cleaning windows, electronic devices, or solar panel applications.

Substrate:

The article 10 includes a substrate 12. The substrate 12 typically provides mechanical support to the article 10. For example, the substrate 12 may provide protection to a front surface of the article 10. Similarly, the substrate 12 may provide protection to a back surface of the article 10, depending on orientation of the article 10. The substrate 12 may be soft and flexible or may be rigid and stiff. Alternatively, the substrate 12 may include rigid and stiff segments while simultaneously including soft and flexible segments. The substrate 12 may be load bearing or non load bearing and may be included in any portion of the article 10. The substrate 12 may be a "top layer," also known as a super-strate. The substrate 12 may be used to protect the article 10 from environmental conditions such as rain, snow, and heat.

The substrate 12 is not particularly limited in composition and may be, include, consist essentially of, or consist of, glass, metal, wood, plastic, ceramics, and/or silicone, e.g. linear and/or branched polyorganosiloxanes. In one embodiment, the substrate 12 is, includes, consists essentially of (and, e.g. does not include organic monomers or polymers or silicones), or consists of, glass (e.g. an amorphous soda-lime glass). The substrate 12 may be a combination of one or more of the aforementioned materials. For example, the substrate 12 may have a coating thereon before being utilized as described herein.

Nanoparticle Layer:

The article 10 also includes a nanoparticle layer 16. The nanoparticle layer 16 is disposed on the substrate 12. In various non-limiting embodiments, it is also contemplated that the terminology disposed may be substituted with the terminology deposited. The nanoparticle layer 16 may be disposed on, and in direct contact with, the substrate 12. Alternatively, the nanoparticle layer 16 may be disposed on, and spaced apart from (i.e., not in direct contact with), the substrate 12. Even if the nanoparticle layer 16 is not in direct contact with the substrate 12, the nanoparticle may be described as "disposed on" the substrate 12. However, the disclosure is not limited to a lack of direct contact.

The nanoparticle layer 16 may include, be, consist essentially of, or consist of, nanoparticle agglomerates 14. Nanoparticle agglomerates are typically clusters of nanoparticles or assemblies of nanoparticles. Nanoparticle agglomerates 14 are not individual nanoparticles stacked upon one another due solely to gravity or bilayers or individual nanoparticles (uniformly) stacked on one another. The nanoparticle agglomerates 14 can be in any geometric shape including, but not limited to, cubes, cubooctahedrons, dodecahedrons, tetrahedrons, hexahedrons, octahedrons, decahedrons, dodecaheltahedrons, trigonals, trigonal prisms, hexagonal antiprisms, etc.

The nanoparticle agglomerates 14 may be (highly) irregular, and have an average volume based size of at least 100 nanometers as determined using dynamic light scattering via ISO 13320. More specifically, 0.1 wt % of particles are disposed in ethanol and measured using a Nanotrac 150, according to ISO 13320. In various embodiments, the nanoparticle agglomerates 14 have an average volume based size of at least 200, 300, 400, 500, 600, 700, 800, 900, 1000, 1,500, 2,000, 2,500, 3,000, 3,500, 4,000, 4,500, or 5,000, nm, as determined using dynamic light scattering via ISO 13320. In other embodiments, the nanoparticle agglomerates 14 have an average volume based size of from 500 to 2,000, from 500 to 1,500, from 500 to 1,000, from 1,000 to 2,000, from 1,000 to 1,500, or from 1,500 to 2,000, nanometers, as determined using dynamic light scattering via ISO 13320. Alternative methods of measurement may also be used, such as TEM. As is known in the art, average volume based sizes are typically reported in a curve, such as a bell-shaped curve. In additional embodiments, any value, or range of values, both whole and fractional, within or between any one or more values described above are contemplated.

As is described in greater detail below, the nanoparticles before agglomeration (i.e., non-agglomerated nanoparticles), are smaller than the nanoparticle agglomerates 14. The nanoparticles before agglomeration typically have an average particle diameter of from 10 to 2,500, from 10 to 2,000, from 10 to 1,000, from 10 to 200, 20 to 150, or 50 to 100, nm, as determined using dynamic light scattering via ISO 13320. The aforementioned terminology "consists essentially of" describes an embodiment wherein the nanoparticle layer 16 is free of polymers. In additional embodiments, any value, or range of values, both whole and fractional, within or between any one or more values described above are contemplated.

The nanoparticle layer 16 may also include non-agglomerated nanoparticles. In various embodiments, the non-agglomerated nanoparticles, in conjunction with the nanoparticle agglomerates 14, provide unique topography to the nanoparticle layer 16, which is not replicated by non-agglomerated nanoparticles alone or by non-agglomerated nanoparticles which are stacked merely by gravity. The unique topography is thought to contribute to hydrophobicity and durability of the article 10 and the outermost layer 20, described below.

Figure 2A:
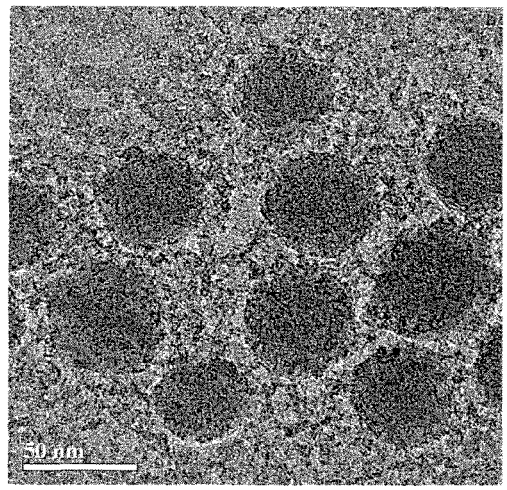
FIG. 2A is a TEM image of non-agglomerated nanoparticles, i.e., nanoparticles before agglomeration, that may be utilized in this disclosure. The nanoparticles of FIG. 2A are prepared using the Stöber process described in the Examples.
Figure 2B:
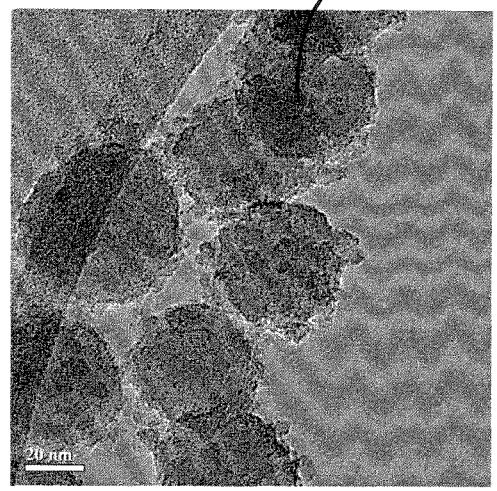
FIG. 2B is a TEM image of nanoparticle agglomerates, i.e., the nanoparticles of FIG. 2A after agglomeration, that may be utilized in this disclosure. The nanoparticle agglomerates of FIG. 2B are prepared using the process also described in the Examples.

The nanoparticles themselves are not particularly limited. In various embodiments, the nanoparticles are silica, alumina, or combinations thereof. In one embodiment, the nanoparticles provide the hierarchical roughness necessary for the article 10 wherein primary particles of silica contribute to nanoscale roughness while nanoparticle aggregates introduce larger scale roughness. Nanoparticle agglomerates 14 and non-agglomerated nanoparticles are shown in FIGS. 2A and 2B.

The nanoparticle layer 16 is not particularly limited in dimensions. For example, the nanoparticle layer 16 may have a thickness of up to 10 microns, e.g. 5 to 10, 6 to 9, or 7 to 8, microns. In other embodiments, the nanoparticle layer 16 has a thickness of ±10, 50, or 100, %. In additional embodiments, any value, or range of values, both whole and fractional, within or between any one or more values described above are contemplated.

Figure 5A:
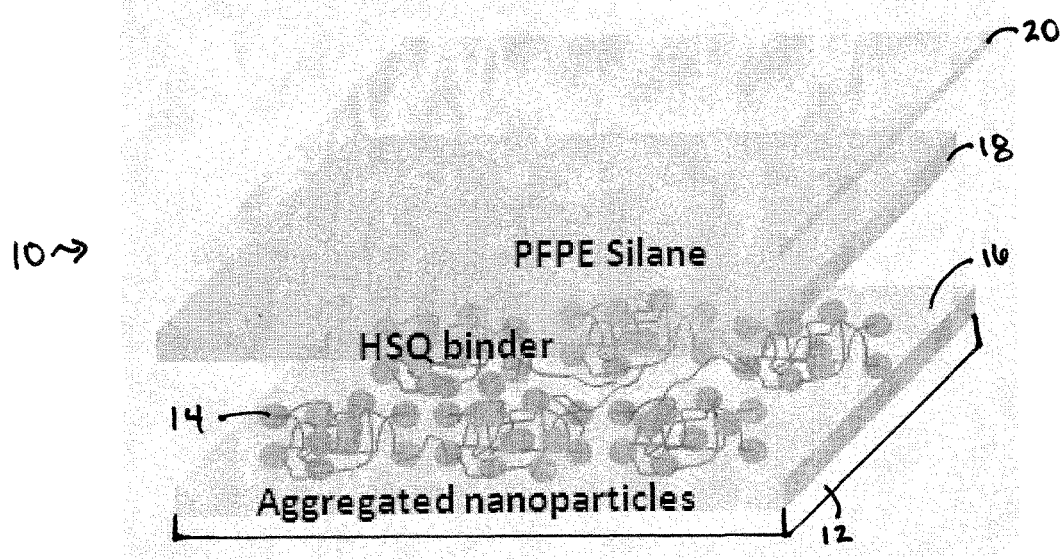
FIG. 5A is a perspective view of one embodiment of the article of this disclosure that is free of an adhesive layer.
Figure 5B:
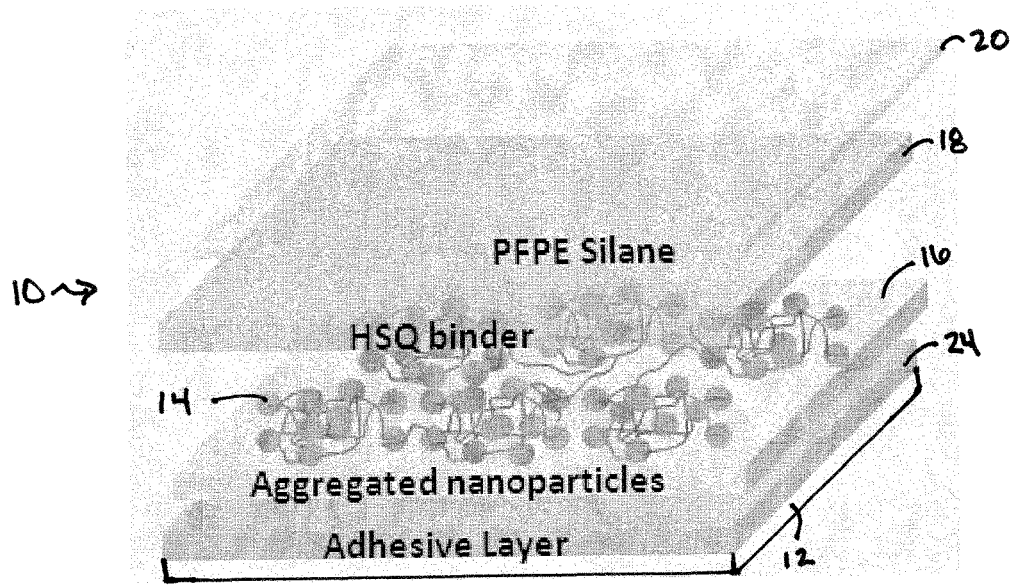
FIG. 5B is a perspective view of another embodiment of the article of this disclosure that includes an adhesive layer.
Figure 5C:
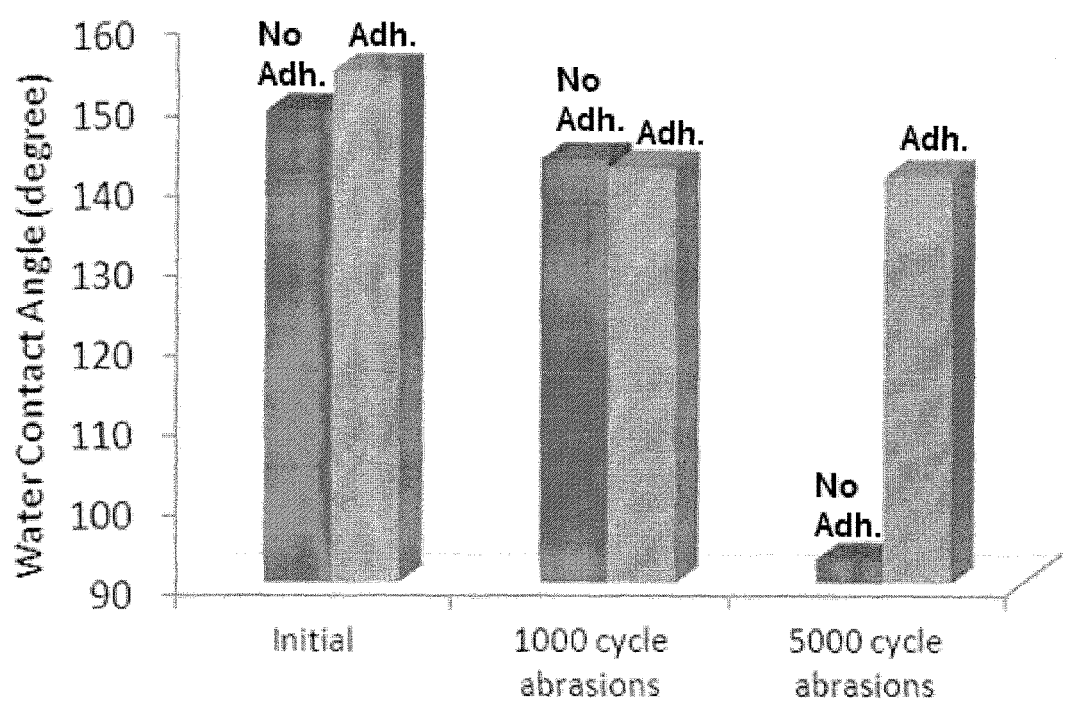
FIG. 5C is a bar graph illustrating water contact angle as a function of presence of an adhesive layer and as a function of number of abrasions.

Binder Layer:

The article 10 also includes a binder layer 18. The binder layer 18 is disposed on and in direct contact with the nanoparticle layer 16, e.g. as shown in FIGS. 5A and 5B. The binder layer 18 includes an oxidatively cured product of a silicon-based resin. Said differently, the binder layer 18 may include, be, consist essentially or, or consist of, the chemical product that exists after the silicon-based resin is oxidatively cured. For example, the terminology "consist essentially of" may describe an embodiment that is free of a non-cured silicon-based resin and/or an organic polymer.

The silicon-based resin may alternatively be described as a silicon resin or as a silicon-containing resin. However, the silicon-based resin is not to be confused with a composite material (such as an organic resin) that includes independent silicon particles dispersed therein. Instead, the silicon-based resin may be, or may be chosen from, a silsesquioxane, a polysilsesquioxane, a silazane or a polysilazane, or combinations thereof. Alternatively, the silicon-based resin may be a silsesquioxane having the formula:

$(R_3SiO_{1/2})_a(R_2SiO_{2/2})_b(RSiO_{3/2})_c(SiO_4)_d$ wherein each R is independently chosen from hydrogen, alkyl, alkenyl, and aryl groups or alkyl, alkenyl, and aryl groups substituted with halogen, nitrogen, oxygen, sulfur or silicon atoms, with the proviso that at least two R groups are hydrogen, wherein a, b, c and d are mole fractions, wherein a+b+c+d is 1, and wherein the sum of c and d is greater than zero. Non-limiting examples of alkyl groups are methyl, ethyl, propyl, butyl, e.g. having 1 to 6 carbon atoms. Non-limiting examples of alkenyl groups include vinyl, allyl and hexenyl. Non-limiting examples of aryls include phenyl. Non-limiting examples of substituted groups include $CF_3$ $(CF_2)_nCH_2CH_2$, where n is 0 to 6.

Hydrogen silsesquioxane includes random network linkages and has a general chemical composition of $(HSiO_{3/2})_n$ wherein n is a positive integer. When cured, e.g. in an oxygen-containing atmosphere, the hydrogen silsesquioxane is driven toward $SiO_2$. Hydrogen silsesquioxane is utilized herein because Si—H bonds react with silanol groups on the substrate 12 if the substrate 12 is glass and may also react with silanol groups on silica nanoparticles. For this reason, hydrogen silsesquioxane can improve both the nanoparticle-nanoparticle adhesion and also the adhesion of the binder layer 18 to the substrate 12. In addition, cured hydrogen silsesquioxane is relatively hard and serves to increase nanoparticle coating durability. Moreover, hydrogen silsesquioxane forms transparent films which are useful in many applications.

In various embodiments, the binder layer 18 may be, consist essentially of, or consist of, the oxidatively cured product of hydrogen silsesquioxane. The terminology "consist essentially of" describes an embodiment wherein the binder layer 18 is free of resin and/or polymers that are not the oxidatively cured product of hydrogen silsesquioxane. However, in this embodiment, and in general, the binder layer 18 may include hydrogen silsesquioxane that is not cured.

In various non-limiting embodiments, the binder layer 18 includes 0.01, 0.05, 0.1, 0.5, 1, 2, 3, 4, 5, 6, 7, 8, 9, 10, 15, 20, 25, 30, 35, 40, 45, or 50, mol percent of uncured or partially cured hydrogen silsesquioxane. Similarly, the binder layer 18 may include 99.99, 99.95, 99.9, 99.5, 99, 98, 97, 96, 95, 94, 93, 92, 91, 90, 85, 80, 75, 70, 65, 60, 55, or 50, mol percent of oxidatively cured hydrogen silsesquioxane. Typically, cured silsesquioxane is determined based on how much of the Si—H functionality has been converted to Si—O bonds upon oxidative curing. For example, this can be determined using FT-IR techniques wherein an initial measurement is made and an area under the Si—H peaks is determined. Then, a post-oxidative curing measurement can be made wherein a smaller area under any remaining Si—H peaks is determined. The percent Si—H remaining (i.e., not oxidatively cured) can then be determined using subtraction by comparing Si—H stretch absorption area per thickness both before and after cure. In additional embodiments, any value, or range of values, both whole and fractional, within or between any one or more values described above are contemplated.

It is contemplated that, in one embodiment, the binder layer 18 may "be" the oxidatively cured product of hydrogen silsesquioxane and include (approximately) zero, 0.01, 0.05, 0.1, 0.5, 1, 2, 3, 4, or 5 weight percent of uncured or partially cured hydrogen silsesquioxane. The amount or level or curing may be different from those values described above. In additional embodiments, any value, or range of values, both whole and fractional, within or between any one or more values described above are contemplated.

Upon curing, the hydrogen silsesquioxane typically forms Si—O bonds in a network structure, as is appreciated in the art. For example, the hydrogen silsesquioxane may start in a cage form (a) and progress to a network form (b), as shown below.

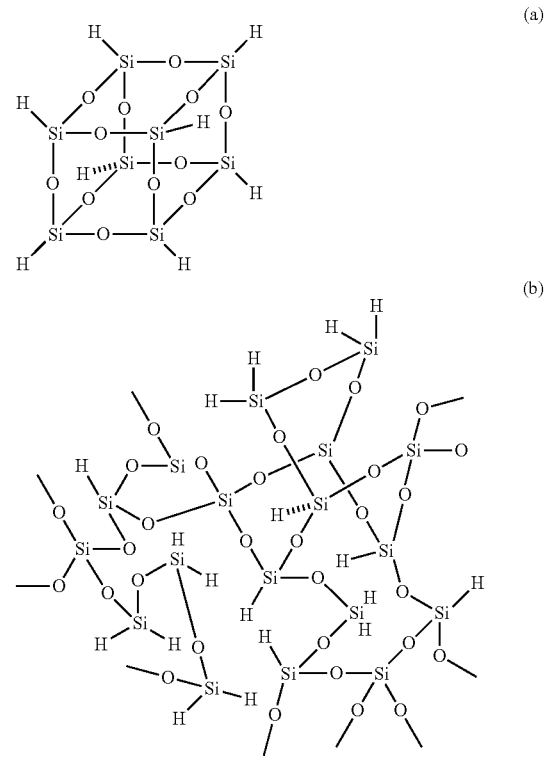

In one embodiment, the silicon-based resin is a hydridosiloxane resin including units of the formula: $HSi(OH)_x(OR)_yO_{z/2}$. In this formula, each R is as defined above. When these R groups are bonded to silicon through the oxygen atom, they form a hydrolyzable substituent. In the above formula, x is 0 to 2; y is 0 to 2; z is 1 to 3; and the sum of x+y+z is 3. These resins may be fully condensed $(HSiO_{3/2})_n$, where n is 8 or greater. Alternatively, these silicon-based resins may be only partially hydrolyzed (i.e., including some Si—OR groups) and/or partially condensed (i.e., including some Si—OH groups).

The structure of the silicon-based resin is not specifically limited. The structure of the resin may be what is generally known at ladder-type, cage-type or mixtures thereof. The silicon-based resin may contain end groups such as hydroxyl groups, triorganosiloxy groups, diorganohydrogensiloxy groups, trialkoxy groups, dialkoxy groups and others. Although not represented by the structure, the silicon-based resin may also contain a small number (e.g. less than about 10%) of the silicon atoms which have either 0 or 2 hydrogen atoms attached thereto and/or a small number of SiC groups such as $CH_3SiO_{3/2}$ or $HCH_3SiO_{2/2}$ groups.

The silicon-based resin may be as described in one or more of U.S. Pat. Nos. 3,615,272, 5,010,159, 4,999,397, 5,210,160, 5,063,267, 5,416,190, and/or Kokai Patent Nos. 59-178749, 60-86017 and 63-107122, each of which is expressly incorporated herein by reference in various non-limiting embodiments.

In various embodiments, the silicon-based resin has a molecular weight from 600 to 150,000, from 1,000 to 150,000, from 10,000 to 150,000, from 20,000 to 140,000, from 30,000 to 130,000, from 40,000 to 120,000, from 50,000 to 110,000, from 60,000 to 100,000, from 70,000 to 90,000, or from 80,000 to 90,000, g/mol. The silicone-containing resin may have less than two (e.g. one or none), two, or more than two, silicon-bonded hydrogen groups per molecule. In additional embodiments, any value, or range of values, both whole and fractional, within or between any one or more values described above are contemplated.

In various embodiments, specific molecular weight fractions of the silicon-based resin may be used. For example, at least 75% of the polymeric species may have a molecular weight above about 1200. In one embodiment, at least 75% of the polymeric species have a number average molecular weight between about 1200 and about 100,000, g/mol.

The terminology "oxidatively cured" may describe partial or complete oxidative curing or any condition that will cause conversion of Si—H bonds to Si—O bonds, in the presence of some form of oxygen atoms, e.g. $O_2$ or oxygen atoms as part of an oxidizing compound. Partial oxidative curing or the terminology "at least partially cured" typically describes wherein less than all of the available Si—H groups are converted to Si—O. Conversely, complete oxidative curing typically describes wherein all or virtually all of the available Si—H groups are converted to Si—O groups, as understood in the art.

In certain embodiments, the term "partial oxidative curing" or at least partial curing describes wherein at least 30 mole percent less than about 90 mole percent, such as at least 50 mole percent and less than about 90 mole percent, such as at least 70 mole percent less than about 90 mole percent, of the available Si—H groups are converted to Si—O groups. In other embodiments, the term "complete oxidative curing" describes wherein all or virtually all of the available Si—H groups are converted to Si—O groups, such as at least 90 mole percent, such as at least 95 mole percent, up to 100 mole percent, of the available Si—H groups are converted to Si—O groups.

Ceramic oxide precursors may also be used in combination with the hydrogen silsesquioxane resin and/or silicon-based resin. The ceramic oxide precursors include but are not limited to compounds of various metals such as aluminum, titanium, zirconium, tantalum, niobium and/or vanadium as well as various non-metallic compounds such as those of boron or phosphorous which may be dissolved in solution, hydrolyzed and subsequently pyrolyzed at relatively low temperature to form ceramic oxides. Additional non-limiting ceramic oxide precursors are described in U.S. Pat. Nos. 4,808,653, 5,008,320 and 5,290,394, herein incorporated by reference in various non-limiting embodiments. In one embodiment, a (550 degree cure) phenol-T resin/methyl-T resin can be used and may show similar structures as oxidatively cured hydrogen-silsesquioxane.

Outermost Layer:

The 10 also includes an outermost layer 20 is disposed on and in direct contact with the binder layer 18 and disposed opposite the substrate 12. For example, the outermost layer 20 may be covalently bonded or reacted with the binder layer 18 or may be free of covalent bonds with the binder layer 18. Said differently, the outermost layer 20 may be not reacted with the binder layer 18. The terminology "not reacted with the binder layer 18" describes that the outermost layer 20 is not covalently or ionically reacted with, or bound to, the binder layer 18. The outermost layer 20 may or may not be hydrogen bonded or otherwise electrostatically attracted to the binder layer 18.

Alternatively, the outermost layer 20, after application, forms one or more covalent bonds with the binder layer 18 and thus can be considered to be a part of, or integral with, the binder layer 18. In one embodiment, the outermost layer 20 extends uniformly across an entirely of the binder layer 18 (e.g. from and between all edges). Alternatively, the outermost layer 20 may extend across some portions of the binder layer 18 and not others, e.g. in a heterogeneous manner or broken pattern.

The outermost layer 20 may be alternatively described as a superstrate. The outermost layer 20, when functioning as a superstrate, may provide protection to a front surface of the article 10. Similarly, the outermost layer 20 may provide protection to a back surface of the article 10, depending on orientation of the article 10. The outermost layer 20 may be soft and flexible or may be rigid and stiff. Alternatively, the outermost layer 20 may include rigid and stiff segments while simultaneously including soft and flexible segments. The outermost layer 20 may be load bearing or non load bearing and may be included in any portion of the article 10. The outermost layer 20 may be used to protect the article 10 from environmental conditions such as rain, snow, and heat. The outermost layer 20 is typically not covalently bonded to the binder layer 18. In other words, the outermost layer 20 is disposed on an in direct contact with the binder layer 18 but is not bonded thereto. It is contemplated that there may be electrostatic attraction, hydrogen bonding, etc. between the outermost layer 20 and the binder layer 18.

The outermost layer 20 is not particularly limited in composition so long as the aforementioned surface energy is fulfilled. Most typically, the outermost layer 20 is hydrophobic. In various embodiments, the outermost layer 20 is, includes, consists essentially of, or consists of, a fluorine containing compound, an organic polymer, a polyorganosiloxane, a silicone containing material, or combinations thereof. Particular non-limiting examples of such outermost layers are perfluoropolyether silane, siloxane substituted silanes, polyfluoropolyether (wherein not all C—H bonds are converted to C—F bonds, perfluoropolyether (wherein all C—H bonds are converted to C—F bonds), polytetrafluoroethylene (PTFE), etc. In various embodiments, the terminology "consists essentially of" describes that the outermost layer 20 is free of polymers that are not described immediately above. In additional embodiments, any value, or range of values, both whole and fractional, within or between any one or more values described above are contemplated.

The outermost layer 20 is not particularly limited in dimensions. For example, the outermost layer 20 may have a thickness of as little as one molecule thick (e.g. on the order of 5 nanometers) up to 1 microns. In other embodiments, the outermost layer 20 has a thickness of ±10, 100, 500, 1,000, 5,000, or 10,000, %. In additional embodiments, any value, or range of values, both whole and fractional, within or between any one or more values described above are contemplated.

In other embodiments, the outermost layer 20 is further defined as a surface treatment that is disposed on and in direct contact with the binder layer 18 and reacted with (e.g. covalently bonded to) the binder layer 18. The outermost layer 20 may be present if the surface treatment is not, and vice versa. In one embodiment, they are not present together. The surface treatment, when utilized, is typically reacted with (e.g. covalently or ionically bound to) the binder layer 18. The surface treatment is typically bonded with the binder layer 18 such that it may or may not be an independent "layer." In one embodiment, the surface treatment extends uniformly across an entirely of the binder layer 18 (e.g. from and between all edges). Alternatively, the surface treatment may extend across some portions of the binder layer 18 and not others, e.g. in a heterogeneous manner or broken pattern.

The surface treatment is not particularly limited in dimensions. For example, the surface treatment may have a thickness of as little as one molecule thick (e.g. on the order of 5 nanometers) up to 1 micron. In other embodiments, the surface treatment has a thickness of ±10, 100, 500, 1,000, 5,000, or 10,000, %. In additional embodiments, any value, or range of values, both whole and fractional, within or between any one or more values described above are contemplated.

The outermost layer 20 and/or surface treatment typically have a surface energy of less than 40 mN/m measured at 20° C. In various embodiments, the outermost layer 20 and/or surface treatment have a surface energy of less than 35, 30, 25, 24, 23, 22, 21, 20, or 19, mN/m measured at 20° C. Typically, surface energy is calculated from contact angle results using the Zisman or Owens-Wendt method, as is appreciated in the art. In additional embodiments, any value, or range of values, both whole and fractional, within or between any one or more values described above are contemplated. In still other embodiments, the outermost layer 20 is as described in a U.S. Provisional Patent Application Ser. No. 61/977,314. In these other embodiments, this application is hereby expressly incorporated herein by reference.

Adhesive Layer:

The article 10 may also include an adhesive layer 24, as first introduced above. The adhesive layer 24 includes an adhesive and is disposed on and in direct contact with the substrate 12 and the nanoparticle layer 14. The adhesive layer is not particularly limited and may have a thickness of from 5 nm to 1 micrometer. The adhesive itself is also not particularly limited and is typically a silicon-based resin such as a silsesquioxane, a polysilsesquioxane, a silazane, a polysilazane, or combinations thereof. The adhesive may be partially or completely cured, wherein the description of "partial" and "complete" curing is set forth above. In various embodiments, the adhesive is, includes, consists essentially of, or consists of, an at least partially cured silicon oxide. The terminology "consists essentially of, may describe an embodiment that is free of non-silicon oxide adhesives. The silicon oxide may be any known in the art such as an oxide of a silazane, an oxide of a silsesquioxane, or a combination thereof.

Method of Forming the Article:

This disclosure also provides a method of forming the article 10. The method includes the step of (I) agglomerating the nanoparticles to form the nanoparticle agglomerates 14. For example, the nanoparticles can be first synthesized by any method of the art, e.g. the Stöber method, and can then be agglomerated and/or functionalized, such as with use of an agglomerating agent.

Agglomerating agents may or may not functionalize the nanoparticles. In one embodiment, the agglomerating agent functionalizes the nanoparticles such that the nanoparticles agglomerate to form the nanoparticle agglomerates 14. In another embodiment, the agglomerating agent does not functionalize the nanoparticles but still promotes or causes the agglomeration of the nanoparticles to form the nanoparticle agglomerates 14. Alternatively, the agglomerating agent may be an agent that forms agglomerates of nanoparticles, which are understood in the art to be clusters of nanoparticles that result from a process in which the nanoparticles assemble rather than remain as isolated single nanoparticles and/or rather than stack due solely to gravity. In other words, assembly into nanoparticle agglomerates 14 is not the same as stacking of individual nanoparticles (such as by gravity) to form bi-layers, tri-layers, etc., on a substrate. Agglomeration of nanoparticles to form nanoparticle agglomerates 14 typically does not require a substrate. Similarly, the process of assembly of nanoparticles to form nanoparticle agglomerates 14 can be described as agglomeration by any process other than by gravity alone. In the method, the step of (I) agglomerating typically occurs before the nanoparticles ever contact a substrate. Said differently, the step of (I) agglomerating does not require a substrate and typically occurs in the explicit absence of a substrate. The step of (I) agglomerating can be alternatively described as agglomerating via (use of) a chemical agent, such as the agglomerating agent. Typically, use of the agglomerating agent is required. In an even further embodiment, the nanoparticle agglomerates 14 are clusters of nanoparticles that result from a chemical interaction between individual nanoparticles prior to deposition on a surface or substrate.

Non-limiting examples of suitable agglomerating agents that may or may not functionalize the nanoparticles include amines, alcohols, diols, silanes, surfactants, hydroxy-terminated poly(ethylene oxides), hydroxy terminated polymers, dithiols, mercaptans, and combinations thereof. Non-limiting examples of suitable organosiloxanes are amine silanes, hydroxyl functional silanes, aminosilanes, zwitterionic silanes, and combinations thereof. In one embodiment, the agglomerating agent is chosen from amines, alcohols, diols, silanes, surfactants, hydroxy-terminated polymers, dithiols, mercaptans, and combinations thereof. In one embodiment, the amine is further defined as aminopropyltriethoxysilane. The organic compound and/or the organosilane may be cross-linked or cross-linkable, hydrogen bonded, and/or have ionic interactions. In various embodiments, organosilanes used to aggregate nanoparticles have at least one, e.g. two, hydrolysable linkage, including but not limited to Si—S, Si—O, Si—N, Si—P, and Si—Cl in any combination.

Agglomeration and functionalization may be evaluated using transmission electron microscopy (TEM) images, e.g. as set forth in FIGS. 2A/2B. In one embodiment, prior to functionalization, these nanoparticles show little propensity for agglomeration. In another embodiment, after functionalization, the surface of the nanoparticles includes the organic compound and/or the organosilane, e.g. as shown in FIG. 2B, and particles agglomerate into micron-scale assemblies. Alternatively, any one or more of the aforementioned agglomerating agents may functionalize the surface of the nanoparticles. The nanoparticles may be held together by the organosilane or any one or more of the aforementioned agglomerating agents.

In one embodiment, an organosilane is used as an agglomerating agent and condenses with silanol groups on the surface of the nanoparticles. Alternatively, the agglomerating agent can cause physical agglomeration if the nanoparticles are non-functional relative to the agglomerating agent. In a further embodiment, the nanoparticle agglomerates 14 are formed from nanoparticles having a diameter of from 5 to 1000 nanometers as determined using light scattering via ISO 13320. In other words, in one embodiment, the step of (I) agglomerating the nanoparticles is further defined as applying an organosilane to the nanoparticles such that the nanoparticles agglomerate, wherein the nanoparticles have a diameter of from 5 to 1000 as determined using dynamic light scattering via ISO 13320.

The method also includes the step of (II) disposing the nanoparticle agglomerates 14 on the substrate 12 to form the nanoparticle layer 16 disposed on the substrate 12. The step of disposing is not particularly limited and may be or include any known in the art. For example, the step of disposing may be further defined as spraying or spray coating, spin coating, drip coating, flow coating, drawdown bar coating, brush coating, vapor deposition, pouring, etc., the nanoparticle agglomerates 14 on the substrate 12.

Using spraying techniques, the morphology of the nanoparticle agglomerates 14 and the nanoparticle layer 16 can be readily tuned by changing spray parameters. Several spray parameters can be utilized to adjust hydrophobicity and optical haze, including fluid pressure, stroke, atomization pressure, and spacing. For example, stroke and spacing may be utilized to adjust hydrophobicity. Spacing and fluid pressure may be utilized to adjust haze. Increased (or high) atomization pressures can be utilized to decrease spray droplet size to maximize surface coating uniformity. In one embodiment, ethanol is utilized as a delivery solvent. However, any suitable delivery solvent may be chosen. In one embodiment, ethanol, due to a high surface energy, does not wet the substrate 12 which aids delivery of the nanoparticle agglomerates 14 to the substrate 12 with defined gaps or voids between the nanoparticle agglomerates 14. In addition, height of spray heads may be adjusted to maximize solvent evaporation during and after spray. In addition, haze and surface roughness may be related.

Figure 3A:
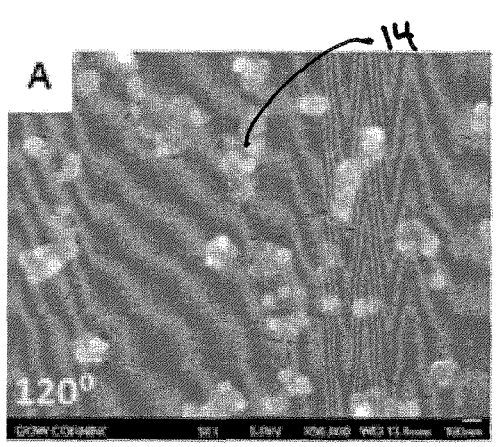
FIGS. 3A-3E are SEM images of various morphological options of the nanoparticle agglomerates of this disclosure. Examples 1A-1E in Table 1 correspond to FIGS. 3A-3E, respectively.
Figure 3B:
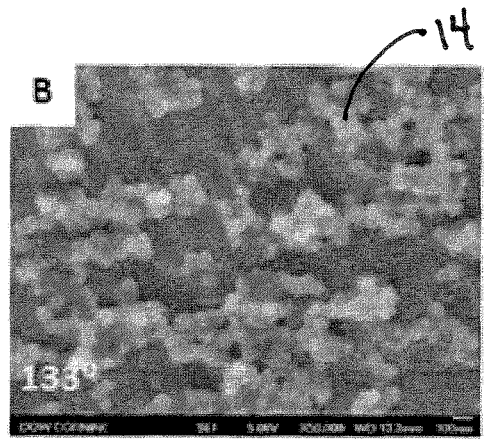
Figure 3C:
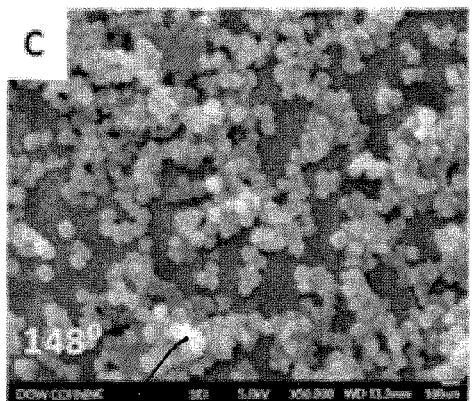
Figure 3D:
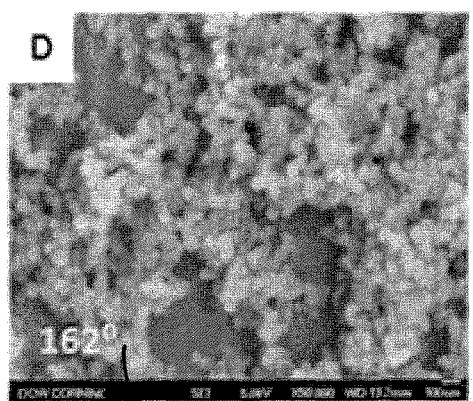
Figure 3E:
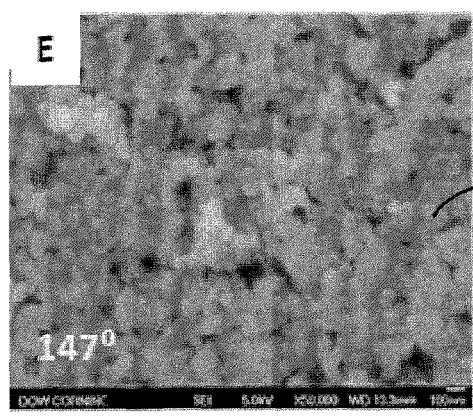
Figure 4A:
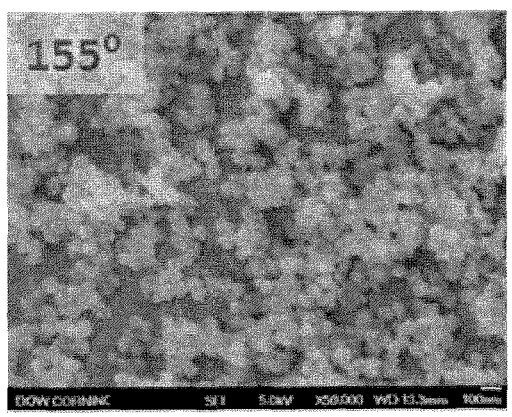
FIGS. 4A and 4B are SEM images of increasing amounts of silicon-based resin present in an article and the corresponding reduction in water contact angle. Examples 2A and 2D in Table 2 correspond to FIGS. 4A and 4B, respectively.
Figure 4B:
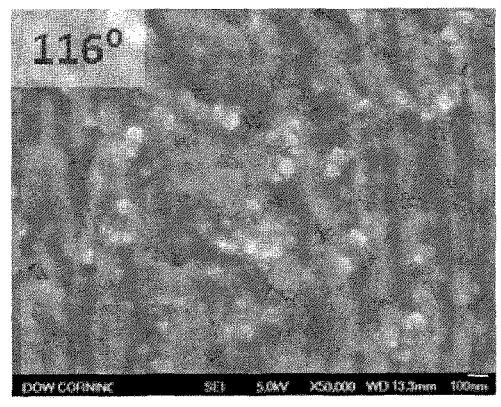

In addition, scanning electron microscopy (SEM) and atomic force microscopy (AFM) examinations can be utilized to better understand how surface morphology of the nanoparticle layer 16 affects the hydrophobicity of the article 10. Contact angle may increase, e.g. from 120° in FIG. 3A to 147° in FIG. 3E, while water sliding angles may all be greater than 25°, indicating a Wenzel state. These images demonstrate that higher contact angles are a result of increased nanoparticle surface coverage. The increased surface coverage tends to decrease the spacing between nanoparticle agglomerates 14 and typically leads to a higher surface roughness. However, too much agglomerated nanoparticle coverage can fill gaps between nanoparticle agglomerates 14 thereby resulting in decreased surface roughness, and thus lower hydrophobicity.

Choice of appropriate spray parameters typically allows for transition from a Wenzel state to a Cassie state. For example, surface morphology may change between a low surface coverage Wenzel state, a Cassie state where the sliding angle decreases, and a high surface coverage Wenzel state. The primary morphology differences between such examples may be that the nanoparticle agglomerates 14 are taller and the fraction of bare glass surface is lower.

In various embodiments, height, size, and spacing, of nanoparticle agglomerates 14 may influence contact angle. For example, a liquid drop may be in a Wenzel state, which means the drop can penetrate through the nanoparticle layer 16. This is preferably avoided and can occur if there are (large) gaps between the nanoparticle agglomerates 14. When the size, spacing, and height are customized, the drop can transition to a Cassie state wherein the drop may be suspended above the substrate 12 by the nanoparticle layer 16. As more nanoparticle agglomerates 14 are added, the size of the gaps between nanoparticle agglomerates 14 typically decreases and the size of agglomeration is increased. In still other embodiments, surface morphologies can dictate superhydrophobicity.

The method also includes the step of (III) applying the silicon-based resin on the nanoparticle agglomerates 14. The silicon-based resin can be applied by any method in the art. For example, the silicon-based resin can be applied by pouring, spraying, coating, and the like or any described above.

The method also includes the step of (IV) oxidatively curing the silicon-based resin on the nanoparticle agglomerates 14 to form the binder layer 18 disposed on and in direct contact with the nanoparticles layer. The step of curing may utilize any steps, procedures, or parameters known in the art. For example, the step of curing typically includes heating, plasma treatment, cure using catalyst, etc. Heating can be to or at a temperature of from 100 to 750° C., or any value or range of values therebetween.

The method also includes the step of (V) disposing the outermost layer 20 on and in direct contact with the binder layer 18. The outermost layer 20 is as described above and may be disposed in any manner known in the art. For example, the outermost layer 20 may be placed, sprayed, poured, or coated on the binder layer 18. Alternatively, the step of disposing may be further described as completed using any method described above.

The method may further or alternatively include bonding (e.g. covalently or ionically) the outermost layer 20 to the binder layer. For example, this step may be further defined as disposing the surface treatment on and in direct contact with the binder layer. The surface treatment may be disposed via any method described above.

The method may further include the step of applying the adhesive layer. The adhesive layer may be applied as a solid or liquid adhesive which is then cured to form the adhesive layer. Alternatively, no curing may be needed or present. The adhesive and/or adhesive layer may be applied using any method described above.

Additional Embodiments

In one additional embodiment, the article 10 includes a pre-aggregated nanoparticle layer 16 to provide morphology typically utilized to obtain high water contact angle, a hydrogen silsesquioxane binder layer 18 and/or adhesive layer to improve film durability, and a PFPE-silane layer to lower surface energy.

In another embodiment, to create the nanoparticle layer 16, colloidal silica particles are first synthesized by the Stöber method and then functionalized with aminopropyltriethoxysilane. In still other embodiments, morphology of the article 10 and the nanoparticle agglomerates 14 and/or any layer of the article 10 can be readily tuned by changing the spray parameters. In addition, spray parameters can be tuned to optimize coating hydrophobicity and optical haze, including fluid pressure, stroke, atomization pressure, and spacing. For example, stroke and spacing may be utilized to control hydrophobicity while spacing and fluid pressure may be utilized to control haze. In addition, a high atomization pressure can be chosen to decrease spray droplet size to obtain a more uniform surface coating.

In still other embodiments, and to evaluate the mechanical durability of one or more layers of the present article 10, surfaces can be abraded using a Taber abraser with a cloth fabric as the abrading material. For examples, articles without a binder may exhibit poor durability such that the entire article 10 may be destroyed after 100 cycles of abrasion. In addition, water contact angle may be low and further degraded after abrasion if one or more layers are removed.

Moreover, in some embodiments, upon curing HSQ under oxidative conditions, e.g. in $O_2$ or air, Si—H bonds are oxidized, and Si—O bond density increases as the cure temperature is increased. An increased Si—O fraction may lead to increased hardness and increased durability. For example, when the silicon-based resin or HSQ is cured at 350° C., the water contact angle may rapidly decrease as the sample is abraded. When the silicon-based resin or HSQ is cured at 550° C., the water contact angle may change more slowly upon abrasion, indicating that the film integrity has increased. Moreover, as more silicon-based resin or HSQ is utilized, it may fill voids between adjacent nanoparticle clusters, which decreases film roughness, and results in lower hydrophobicity.

In still other embodiments, there are several parameters that can be adjusted to impact a ratio of silicon-based resin or HSQ:nanoparticle ratio. For example, changing the stroke may result in a an increased silicon-based resin or HSQ:nanoparticle ratio and enhanced durability. However, over-utilization of silicon-based resin or HSQ may reduce water contact angle because it may fill in the gaps between nanoparticle agglomerates. In even further embodiments, it may be necessary to retain a porous surface morphology when driving toward a high water contact angle. In still other embodiments, the article 10 includes a silicon-based resin or HSQ primer layer. This layer can with silanol groups on a substrate 12, e.g. a glass substrate 12, and tether the nanoparticles to the surface.

Some embodiments include any one or more of the following numbered aspects.

Aspect 1. A hydrophobic article comprising: A. a substrate; B. a nanoparticle layer disposed on said substrate and comprising nanoparticle agglomerates wherein the nanoparticle agglomerates have an average volume based size of at least 100 nanometers as determined using light scattering via ISO 13320; C. a binder layer disposed on and in direct contact with said nanoparticle layer and comprising an oxidatively cured product of a silicon-based resin; and D. an outermost layer that is disposed opposite said substrate and on and in direct contact with said binder layer; wherein said hydrophobic article has a water contact angle of greater than or equal to 90 degrees as measured on said outermost layer of said hydrophobic article and determined using modified ASTM D5946-04.

Aspect 2. The hydrophobic article of aspect 1 wherein said outermost layer is covalently bonded to said binder layer.

Aspect 3. The hydrophobic article of aspect 1 wherein said outermost layer is free of covalent bonds to said binder layer.

Aspect 4. The hydrophobic article of any one of aspects 1-3 wherein said silicon-based resin has a molecular weight from 600 to 150,000 g/mol and has at least two silicon-bonded hydrogen groups per molecule.

Aspect 5. The hydrophobic article of any one of aspects 1-4 wherein said silicon-based resin is a silsesquioxane, a polysilsesquioxane, a silazane or a polysilazane.

Aspect 6. The hydrophobic article of any one of aspects 1-4 wherein the silicon-based resin is a silsesquioxane having the formula: $(R_3SiO_{1/2})_a(R_2SiO_{2/2})_b(RSiO_{3/2})_c(SiO_4)_d$ wherein each R is independently selected from the group consisting of hydrogen, alkyl, alkenyl, and aryl groups or alkyl, alkenyl, and aryl groups substituted with halogen, nitrogen, oxygen, sulfur or silicon atoms, with the proviso that at least two R groups are hydrogen; wherein a, b, c and d are mole fractions, wherein a+b+c+d is 1, and wherein the sum of c and d is greater than zero.

Aspect 7. The hydrophobic article of any one of aspects 1-4 wherein said silicon-based resin is hydrogen silsesquioxane.

Aspect 8. The hydrophobic article of any one of aspects 1-7 wherein said outermost layer has a surface energy of less than 40 mN/m measured at 20° C.

Aspect 9. The hydrophobic article of any one of aspects 1-7 wherein said outermost layer has a surface energy of less than 30 mN/m measured at 20° C.

Aspect 10. The hydrophobic article of any one of aspects 1-7 wherein said outermost layer has a surface energy of less than 20 mN/m measured at 20° C.

Aspect 11. The hydrophobic article of any one of aspects 1-10 further comprising an adhesive layer that comprises an adhesive and that is disposed on and in direct contact with said substrate and said nanoparticle layer.

Aspect 12. The hydrophobic article of aspect 11 wherein said adhesive is at least partially cured and is a silicon oxide.

Aspect 13. The hydrophobic article of aspect 12 wherein said silicon oxide is an oxide of a silazane, an oxide of a silsesquioxane, or a combination thereof.

Aspect 14. The hydrophobic article of any one of aspects 11-13 having a water contact angle of greater than or equal to 80 degrees as determined using modified ASTM D5946-04 after 100 abrasion cycles.

Aspect 15. The hydrophobic article of any one of aspects 1-14 wherein said nanoparticle agglomerates are formed from silica nanoparticles that are functionalized with an agglomerating agent chosen from amines, alcohols, diols, silanes, surfactants, hydroxy-terminated polymers, dithiols, mercaptans, and combinations thereof.

Aspect 16. The hydrophobic article of aspect 15 wherein said agglomerating agent is an organosilane.

Aspect 17. The hydrophobic article of any one of aspects 1-16 wherein said outermost layer comprises a fluorine containing compound.

Aspect 18. The hydrophobic article of any one of aspects 1-16 wherein said outermost layer comprises a polyorganosiloxane.

Aspect 19. The hydrophobic article of any one of aspects 1-18 wherein the nanoparticle agglomerates are formed from nanoparticles having a diameter of from 5 to 1000 nanometers as determined using light scattering via ISO 13320.

Aspect 20. A method of forming a hydrophobic article comprising (A) a substrate, (B) a nanoparticle layer disposed on the substrate and comprising nanoparticle agglomerates wherein the nanoparticle agglomerates have an average volume based size of at least 100 nanometers as determined using light scattering via ISO 13320, (C) a binder layer disposed on and in direct contact with the nanoparticle layer and comprising an oxidatively cured product of a silicon-based resin; and (D) an outermost layer that is disposed opposite said substrate and on and in direct contact with the binder layer, said method comprising the steps of: I. agglomerating nanoparticles to form the nanoparticle agglomerates having the average volume based size of at least 100 nanometers as determined using light scattering via ISO 13320; II. disposing the nanoparticle agglomerates on the substrate to form the nanoparticle layer disposed on the substrate; Ill. applying the silicon-based resin on the nanoparticle agglomerates; IV. oxidatively curing the silicon-based resin on the nanoparticle agglomerates to form the binder layer disposed on and in direct contact with the nanoparticles layer; V. disposing the outermost layer opposite the substrate and on and in direct contact with the binder layer to form the hydrophobic article, wherein the hydrophobic article has a water contact angle of greater than or equal to 120 degrees as measured on the outermost layer after the hydrophobic article is formed and determined using modified ASTM D5946-04.

Aspect 21. The method of aspect 20 wherein the outermost layer is covalently bonded to the binder layer.

Aspect 22. The method of aspect 20 wherein the outermost layer is free of covalent bonds to the binder layer.

Aspect 23. The method of any one of aspects 20-22 wherein said step of (I) agglomerating the nanoparticles is further defined as applying an organosilane to the nanoparticles such that the nanoparticles agglomerate, wherein the nanoparticles have a diameter of from 5 to 1000 nanometers as determined using dynamic light scattering via ISO 13320.

Aspect 24. The method of any one of aspects 20-23 wherein said step of (II) disposing is further defined as disposing the nanoparticle agglomerates on and in direct contact with the substrate.

Aspect 25. The method of any one of aspects 20-23 wherein said step of (II) disposing is further defined as disposing the nanoparticle agglomerates such that the nanoparticle layer is disposed on and spaced apart from the substrate, and wherein the method further comprises the step of (VI) applying an adhesive on the substrate to form an adhesive layer such that the adhesive layer is disposed on and in direct contact with the substrate and the nanoparticle layer.

Aspect 26. The method of aspect 25 wherein the adhesive is at least partially cured and is a silicon oxide.

Aspect 27. The method of aspect 26 wherein the silicon oxide is an oxide of a silazane, an oxide of a silsesquioxane, or a combination thereof.

Aspect 28. The method of any one of aspects 25-27 wherein the hydrophobic article has a water contact angle of greater than or equal to 80 degrees as determined using modified ASTM D5946-04 after 100 abrasion cycles.

Aspect 29. The method of any one of aspects 20-28 wherein the silicon-based resin has a molecular weight from 600 to 150,000 g/mol and has at least two silicon-bonded hydrogen groups per molecule.

Aspect 30. The method of any one of aspects 20-29 wherein the silicon-based resin is a silsesquioxane, a polysilsesquioxane, a silazane or a polysilazane.

Aspect 31. The method of any one of aspects 20-29 wherein the silicon-based resin is a silsesquioxane having the formula: $(R_3SiO_{1/2})_a(R_2SiO_{2/2})_b(RSiO_{3/2})_c(SiO_4)_d$ wherein each R is independently selected from the group consisting of hydrogen, alkyl, alkenyl, and aryl groups or alkyl, alkenyl, and aryl groups substituted with halogen, nitrogen, oxygen, sulfur or silicon atoms, with the proviso that at least two R groups are hydrogen; wherein a, b, c and d are mole fractions, wherein a+b+c+d is 1, and wherein the sum of c and d is greater than zero.

Aspect 32. The method of any one of aspects 20-29 wherein the silicon-based resin is hydrogen silsesquioxane.

Aspect 33. The method of any one of aspects 20-32 wherein the outermost layer has a surface energy of less than 40 mN/m measured at 20° C.

Aspect 34. The method of any one of aspects 20-32 wherein the outermost layer has a surface energy of less than 30 mN/m measured at 20° C.

Aspect 35. The method of any one of aspects 20-32 wherein the outermost layer has a surface energy of less than 20 mN/m measured at 20° C.

Examples

To generate various examples, tetraethylorthosilicate (TEOS) is purchased from Aldrich (99%). 25 wt % ammonium hydroxide solution is purchased from Fluka. 3-aminopropyltriethoxysilane is commercially available from Dow Corning. Polyfluoropolyether (PFPE) silane is also commercially available from Dow Corning and has the general formula: $F((CF_2)_3O)_{C'}CF_2CF_2CH_2O(CH_2)_3Si(OMe)_3$, wherein C' is from 17-25. Octamethyltrisiloxane is also commercially available from Dow Corning. Galden HT-170 is a heat transfer fluid from Dupont. Acetic acid is purchased from Aldrich. Glass microscope slides (75 mm×50 mm×1.0 mm) are purchased from Fisher scientific. 4" silica wafers (with thickness of 380-750 μm) are purchased from Pure Wafer, Inc. Ethanol is purchased from Aldrich. Various articles representative of this disclosure are formed and evaluated as described below.

Synthesis: Silica Nanoparticle Preparation (Stöber Method):

In a 250 ml three neck round flask, 6 ml tetraethylorthosilicate was added to 90 ml of ethanol solution. After fully mixing the solution, 6 ml of 25% ammonia was added in one shot to the solution. The mixed solution was then heated to 50° C. for 1 hour. After the reaction, the solution was cooled to room temperature and poured into an open container, and stirred overnight to evaporate ammonia. Dynamic light scattering showed the nanoparticle size is approximately 50 nm.

Aggregation/Functionalization of Nanoparticles with Organosilane:

0.54 g of 10 wt % 3-aminopropyltriethoxysilane in ethanol was added dropwise to 15 g of 2.5 wt % silica sol in ethanol. After addition, 1 ml acetic acid was added to the solution. Then the mixture was heated to 50° C. for 1 hour. After cooling to room temperature, the mixture was sonicated in ice water for 30 minutes then diluted to 0.2 wt % solids content for coating.

Test Method—Abrasion Testing:

Various examples are abraded to determine their resistance to scratching while still maintaining an excellent water contact angle, e.g. superhydrophobicity. Abrasion typically destroys hydrophobicity by decreasing contact angle and allowing water to collect on the surface. For that reason, resistance to abrasion is an excellent test to determine longevity of the examples. The abrasion resistance test utilizes a reciprocating abrader Model 5900 produced by Taber Industries of North Tonawanda, N.Y. The test was carried out with Kimberly-Clark Wypall band Microfiber cloths (83630) over a surface area of 20 mm×20 mm. The reciprocating abrader is operated for 100, 500, 1000, 2000, and 5000 cycles at a speed of 40 cycles per minute with a stroke length of 1 inch and a load of 5 N. One backward and forward movement is termed a cycle.

Measuring Water Contact Angle (WCA):

Various examples are evaluated to determine water contact angle (WCA). As described above, higher water contact angles are indicative of increased hydrophobicity. In other words, the greater the water contact angle, the more spread out a drop of water is on a surface. Increased water contact angles are indicative of less surface wetting and thus increased hydrophobicity.

The measurement of static water contact angles was determined using modified ASTM D5946-04 wherein 2 μL deionized water using a VCA Optima XE goniometer produced by AST Products, Inc., Billerica, Mass. Reported data is the average WCA of six measurements at multiple places on the coatings using multiple samples. WCA were measured after the abrasion cycles. Generally, the greater the WCA after abrasion, the greater the durability of the coating. The water sliding angle was measured and used to evaluate the self-cleaning properties and hysteresis. Sliding angle was measured by tilting the goniometer stage slowly to allow a 20 μL water drop to slide.

Measuring Hexadecane Contact Angle (HCA):

The measurement of static hexadecane contact angles was made using 2 μL hexadecane and a VCA Optima XE goniometer. Reported data is the average HCA of four measurements at multiple places on the coatings.

Haze Measurement:

Sample appearance was measured using a BYK Haze-Gard Plus transparency meter. The average of three measurements was recorded for transparency, haze, and clarity.

Cleaning and Activation of Glass Slides as Substrates:

Fisher glass slides were cleaned with detergent in ultrasonic bath for 5 min, and then rinsed with deionized water three times for 2 min each in an ultrasonic bath (Fisher Scientific FS-220). After cleaning, the glass slides were dried in a 125° C. oven for 1 hour. 4" silicon wafers were also used as substrates. Before applying coatings, the glass slides and silicon wafers were plasma treated with Argon (300 W, 60 seconds) using a March Plasma PX250 chamber. The activated substrates were used immediately.

Spray Coating of Various Layers:

All layers are applied using a PVA-1000™ Selective Coating System with a Nozzle of V318 round spray cap and nozzle height of 7.2 cm and a speed of 150 mm/s.

Thin Film Characterizations:

TEM: Suspensions of synthesized silica nanoparticle and aggregated nanoparticles were sonicated and transferred onto carbon-filmed Cu grids. After drying, the samples were analyzed with the JEOL JEM-2100F TEM operated at an accelerating voltage of 200 kV. The TEM images were recorded with a Gatan CCD camera and Digital Micrograph software. The TEM scale bar uncertainty is less than 10%.

SEM: Samples of 2A-2D, 3A, and 3B were coated with Pt/Pd and analyzed using the JEOL 6335F SEM. Images were collected at three pre-defined magnifications to allow direct comparison between samples. The fraction of bare glass area was established by contrast masking the images using Gwyddion. The 20,000×SEM images were analyzed using an image processing program (Gwyddion). Areas of dark contrast were assumed to represent regions of bare glass. A contrast threshold was chosen, and a count of dark vs. bright pixels was performed.

Non-Limiting Examples of Various Articles:

All layers are coated on Fisher glass slides. 0.2 wt % of the aforementioned nanoparticles in EtOH were sprayed onto glass slides (to form the nanoparticle layer disposed on the substrate) with a nozzle height of 7.2 cm, a speed of 150 mm/s, and with atomization pressure (AP), fluid pressure (FP), stoke, and space according to the table below. After coating, the slides were dried in air, then 0.2 wt % polyfluoropolyether (PFPE) silane in Galden HT-170 (as a surface treatment) was sprayed having an AP of 1 psi, a FP of 5 psi, a stroke of 2 mil, a nozzle height of 5.3 cm, and a speed of about 100 mm/sec, with spacing of 9 mm to form the binder layer disposed on the nanoparticle layer. After coating, the layers were cured at 125° C. oven with water vapor for 1 hour.

The following examples describe that the spray process condition can tune surface morphology and hydrophobicity. 0.2 wt % of the aforementioned aggregated nanoparticles in ethanol were spray coated under spray conditions of a nozzle height of 7.2 cm, a speed of about 150 mm/sec, atomization pressure (AP) of 8 psi, and with other different spray parameters are set forth in Table 1 below. After drying, 0.2 wt % of the aforementioned polyfluoropolyether (PFPE) silane was sprayed on the surface with AP 3 psi, fluid pressure (FP) of 5 psi, stroke of 2.0 mils, and spacing of 5 mm. The layers were cured at 125° C. in an oven with water vapor for 1 hour. The coating roughness, WCA, and Haze under different spray conditions are set forth in Table 1.

TABLE 1

| | Spray Conditions | | | Layer Properties | |
| --- | --- | --- | --- | --- | --- |
| | | | Fluid | | |
| Example | Stroke (mil) | Spacing (mm) | pressure (psi) | WCA (±2°) (degree) | Haze (%) |
| 1 A | 2.0 | 7.5 | 8.0 | 120 | 1.2 |
| 1 B | 2.0 | 2.0 | 5.0 | 133 | 1.6 |
| 1 C | 2.0 | 2.0 | 8.0 | 148 | 2.5 |
| 1 D | 2.5 | 1.5 | 5.0 | 162 | 4.9 |
| 1 E | 2.5 | 2.5 | 6.5 | 147 | 2.2 |

The following examples describe coating durability without a HSQ binder layer and with a different amount of HSQ in a binder layer. 0.2 wt % of the aforementioned nanoparticles was spray coated with AP of 8 psi, FP of 8 psi, stroke of 2.25 mil, and spacing of 2 mm (to form the nanoparticle layer disposed on the substrate). A variable-thickness HSQ layer was then deposited to form the binder layer. More specifically, 0.2 wt %, 0.5 wt %, and 1 wt % HSQ in Octamethyltrisiloxane was coated with AP of 6 psi, FP of 5 psi, spacing of 5 mm, and stroke of 2.25 mil. After drying the thin layers in air, the layers were then cured on a hotplate at 150° C., 250° C. for 2 minutes each then at 350° C. for 30 minutes in air. Finally, 0.2 wt % polyfluoropolyether (PFPE) silane (as a surface treatment) was sprayed on the surface with AP 3 psi, FP of 5 psi, stroke of 2.0 mils, and spacing of 5 mm. The layers were cured at 125° C. in an oven with water vapor for 1 hour. Coating initial and post-abrasion water contact angles with different amounts of HSQ binder is evaluated and set forth in Table 2 below

TABLE 2

| Example | Organo-silane | HSQ | WCA (degree) (±2°) Initial | 100 Cycle Abrasion As Described Above |
|---|---|---|---|---|
| 2 A | 0.2 wt % | N/A | 155 | 84 |
| 2 B | 0.2 wt % | 0.2 wt % | 144 | 142 |
| 2 C | 0.2 wt % | 0.5 wt % | 135 | 132 |
| 2 D | 0.2 wt % | 1.0 wt % | 116 | 119 |

The following examples describe coating durability with (Example 3A) and without (Example 3B) an adhesive layer in article 10. In further examples, 0.2 wt % HSQ was sprayed with AP 3 psi, FP of 5 psi, stroke of 2 mil, and spacing of 5 mm. The coatings were dried in air, and then 0.2 wt % of the aforementioned aggregated nanoparticles were spray coated with AP of 8 psi, FP of 8 psi, stroke of 2 mil, and spacing of 1.75 mm (to form the nanoparticle layer deposited on the substrate). This was followed with a binder layer. More specifically, 0.2 wt % HSQ layer was coated with AP of 8 psi, FP of 5 psi, spacing of 5 mm, and stroke of 2.25 mil. After drying the thin layer in air, the layers were then cured in a horizontal quartz tube furnace at 150° C., 250° C., and 350° C. for 5 minutes each under N2 then 550° C. in $O_2$ for 1 hour. Finally, 0.2 wt % DC-2634 was sprayed on the surface with AP 3 psi, FP of 5 psi, stroke of 2.0 mils, and spacing of 5 mm. The layers were cured at 125° C. oven with water vapor for 1 hour. Subsequently, the impact of coating configuration on durability was evaluated and is set forth in Table 3 below.

TABLE 3

| | WCA (degree) (±2°) After Abrasion As Described Above | | | HCA (degree) (±2°) After Abrasion As Described Above | | |
|---|---|---|---|---|---|---|
| Example | Initial | 1000 cycle | 5000 cycle | Initial | 1000 cycle | 5000 cycle |
| Example 3A | 149 | 143 | 93 | 82 | 76 | 60 |
| Example 3B | 154 | 142 | 141 | 87 | 79 | 74 |

The following examples describe coating hydrophobicity and durability under different HSQ binder layer and aggregated nanoparticle spray conditions. In still additional examples, 0.2 wt % HSQ was sprayed with AP 3 psi, FP of 5 psi, stroke of 2 mil, and spacing of 5 mm to form the adhesive layer. The coatings were dried in air, and then 0.2 wt % of the aforementioned aggregated nanoparticles were spray coated with AP of 8 psi, FP of 8 psi, stroke of 2 mil, and spacing of 1.75 mm such that the nanoparticle layer and the adhesive layer are deposited in direct contact with each other. This was followed by a binder layer applied thereto. More specifically, 0.2 wt % HSQ layer was coated with AP of 8 psi, FP of 5 psi, spacing of 5 mm, and stroke of 2 mil, 2.25 mil, and 2.5 mil respectively. After drying the thin layers in air, the layers were then cured in a horizontal quartz tube furnace at 150° C., 250° C., and 350° C. for 5 minutes each under N2 then 550° C. in O2 for 1 hour. Finally, 0.2 wt % Polyfluoropolyether (PFPE) Silane was sprayed on the surface with AP 3 psi, FP of 5 psi, stroke of 2.0 mils, and spacing of 5 mm. The layers were cured at 125° C. oven with water vapor for 1 hour. WCA and HCA are shown in Table 4 example 4A-4C.

In additional examples, 0.2 wt % of the aforementioned aggregated nanoparticles were spray coated with AP of 8 psi, FP of 8 psi, stroke of 2 mil, and spacing of 1.5 mm, 1.75 mm, and 2 mm respectively. Then, a binder layer was applied. More specifically, 0.2 wt % of an HSQ layer was coated with AP of 5 psi, FP of 5 psi, spacing of 5 mm, and stroke of 2.25 mil. After drying the thin layer in air, the layers were then cured in a horizontal quartz tube furnace at 150° C., 250° C., and 350° C. for 5 minutes each under N2 then 550° C. in O2 for 1 hour. Finally, 0.2 wt % DC-2634 was sprayed on the surface with AP 3 psi, FP of 5 psi, stroke of 2.0 mils, and spacing of 5 mm. The layers were cured at 125° C. oven with water vapor for 1 hour. Subsequently, coating durability under different conditions was evaluated and is set forth in Table 4 example 4D-4F.

TABLE 4

| | APT-ST | T-HSQ | WCA (degree) (±2°) After Abrasion As Described Above | | | | HCA (degree) (±2°) After Abrasion As Described Above | | | |
|---|---|---|---|---|---|---|---|---|---|---|
| Example | Spacing (mm) | Stroke (ml) | Initial | 1000 cycle | 2000 cycle | 5000 cycle | Initial | 1000 cycle | 2000 cycle | 5000 cycle |
| 4A | 1.5 | 2 | 147 | 128 | 112 | N/A | 83 | 75 | 65 | N/A |
| 4B | 1.5 | 2.25 | 150 | 141 | 140 | 135 | 87 | 79 | 76 | 74 |
| 4C | 1.5 | 2.5 | 154 | 141 | 141 | 141 | 86 | 81 | 79 | 80 |
| 4D | 1.5 | 2.25 | 149 | 135 | 115 | N/A | 86 | 76 | 69 | N/A |
| 4E | 1.75 | 2.25 | 153 | 142 | 142 | 114 | 88 | 77 | 77 | 67 |
| 4F | 2 | 2.25 | 150 | 143 | 142 | 123 | 84 | 79 | 78 | 76 |

The data set forth above show that the article and method of this disclosure produce excellent results. More specifically, the articles have increased durability even after abrasion.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

What is claimed is:

1. A hydrophobic article comprising:
   A. a substrate;
   B. a nanoparticle layer disposed on said substrate and consisting of nanoparticle agglomerates wherein the nanoparticle agglomerates have an average volume based size of at least 100 nanometers as determined using light scattering via ISO 13320;
   a binder layer disposed on and in direct contact with said nanoparticle layer and comprising an oxidatively cured product of a silicon-based resin selected from a polysilsesquioxane or a silsesquioxane having the formula:

$(R_3SiO_{1/2})_a(R_2SiO_{2/2})_b(RSiO_{3/2})_c(SiO_4)_d$ wherein each R is independently selected from the group consisting of hydrogen, alkyl, alkenyl, and aryl groups or alkyl, alkenyl, and aryl groups substituted with halogen, nitrogen, oxygen, sulfur or silicon atoms, with the proviso that at least two R groups are hydrogen and wherein a, b, c and d are mole fractions, wherein a+b+c+d is 1, and wherein the sum of c and d is greater than zero; with a further proviso that such silicon-based resin comprises units of the formula: $HSi(OH)_x(OR)_yO_{z/2}$ wherein each R is as defined above and x is 0 to 2; y is 0 to 2; z is 1 to 3; and the sum of x+y+z is 3; and
   C. an outermost layer that is disposed opposite said substrate and on and in direct contact with said binder layer;
   wherein said hydrophobic article has a water contact angle of greater than or equal to 90 degrees as measured on said outermost layer of said hydrophobic article and determined using modified ASTM D5946-04.

2. The hydrophobic article of claim 1 wherein said outermost layer is covalently bonded to said binder layer.

3. The hydrophobic article of claim 1 wherein said outermost layer is free of covalent bonds to said binder layer.

4. The hydrophobic article of claim 1 wherein said silicon-based resin has a molecular weight from 600 to 150,000 g/mol and has at least two silicon-bonded hydrogen groups per molecule.

5. The hydrophobic article of claim 1 wherein said outermost layer has a surface energy of less than 40 mN/m measured at 20° C.

6. The hydrophobic article of claim 1 further comprising an adhesive layer that comprises an adhesive and that is disposed on and in direct contact with said substrate and said nanoparticle layer.

7. The hydrophobic article of claim 6 wherein said adhesive is at least partially cured and is a silicon oxide.

8. The hydrophobic article of claim 6 having a water contact angle of greater than or equal to 80 degrees as determined using modified ASTM D5946-04 after 100 abrasion cycles.

9. The hydrophobic article of claim 1 wherein said nanoparticle agglomerates are formed from silica nanoparticles that are functionalized with an agglomerating agent chosen from amines, alcohols, diols, silanes, surfactants, hydroxy-terminated polymers, dithiols, mercaptans, and combinations thereof.

10. The hydrophobic article of claim 9 wherein said agglomerating agent is an organosilane.

11. The hydrophobic article of claim 1 wherein said outermost layer comprises a fluorine containing compound or wherein said outermost layer comprises a polyorganosiloxane.

* * * * *